(12) United States Patent
Kuryata et al.

(10) Patent No.: US 8,156,093 B2
(45) Date of Patent: Apr. 10, 2012

(54) MEMORY OBJECT SHARING FOR JUST IN TIME COMPILED DATA

(75) Inventors: Sergiy V. Kuryata, Redmond, WA (US); Michael J. McLaughlin, Kirkland, WA (US); Brian J. Smith, Seattle, WA (US); Steven J. Pratschner, Duvall, WA (US); Ramesha Chandrashekhar, Redmond, WA (US)

(73) Assignee: Microsoft Corporaton, Redmond, WA (US)

( * ) Notice: Subject to any disclaimer, the term of this patent is extended or adjusted under 35 U.S.C. 154(b) by 476 days.

(21) Appl. No.: 12/401,522

(22) Filed: Mar. 10, 2009

(65) Prior Publication Data
US 2010/0235377 A1    Sep. 16, 2010

(51) Int. Cl.
*G06F 17/30* (2006.01)

(52) U.S. Cl. .................................................. 707/705

(58) Field of Classification Search ............ 707/2, 104.1, 707/705; 717/140
See application file for complete search history.

(56) References Cited

U.S. PATENT DOCUMENTS
2004/0261065 A1 * 12/2004 Abrams et al. ................ 717/140
* cited by examiner

*Primary Examiner* — Etienne Leroux
(74) *Attorney, Agent, or Firm* — Russell S. Krajec; Krajec Patent Offices, LLC

(57) ABSTRACT

Just in time compiled code and other data within a runtime environment may be shared between multiple applications by identifying common data objects and allowing two or more applications to access the data objects. While at least one application is accessing the objects, the objects may remain in memory. When all applications have stopped accessing an object, the object may be removed from memory. One embodiment may use a server process to manage various operations to facilitate sharing between various applications, such as identifying objects that may be removed from memory and adding newly created data to a database of sharable data.

16 Claims, 6 Drawing Sheets

100
RUNTIME ENVIRONMENT
WITH SHARED OBJECTS

MEMORY OBJECT SHARING FOR JUST IN TIME COMPILED DATA

BACKGROUND

Memory objects may be created by various processes operating on a computer system, such as dynamic data that may be created in runtime environment. The runtime environment may be an operating environment that uses a just in time compiler to create native code using an intermediate language code. With each process that is created within the runtime environment, many of the same objects may be created independently for each process.

Large number of memory objects can cause some performance issues. If a device does not have a large amount of random access memory, memory paging systems may be used to store and retrieve data from a slower memory device, such as a hard disk.

Just in time compiled environments operate by creating executable code and other memory objects when an application is started or while an application is running. The executable code may be created by compiling the intermediate language code into native code that may be executable on a local processor. The compiling process causes the application to appear to take a long time to start up.

SUMMARY

Just in time compiled code and other data within a runtime environment may be shared between multiple applications by identifying common data objects and allowing two or more applications to access the data objects. While at least one application is accessing the objects, the objects may remain in memory. When all applications have stopped accessing an object, the object may be removed from memory. One embodiment may use a server process to manage various operations to facilitate sharing between various applications, such as identifying objects that may be removed from memory and adding newly created data to a database of sharable data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
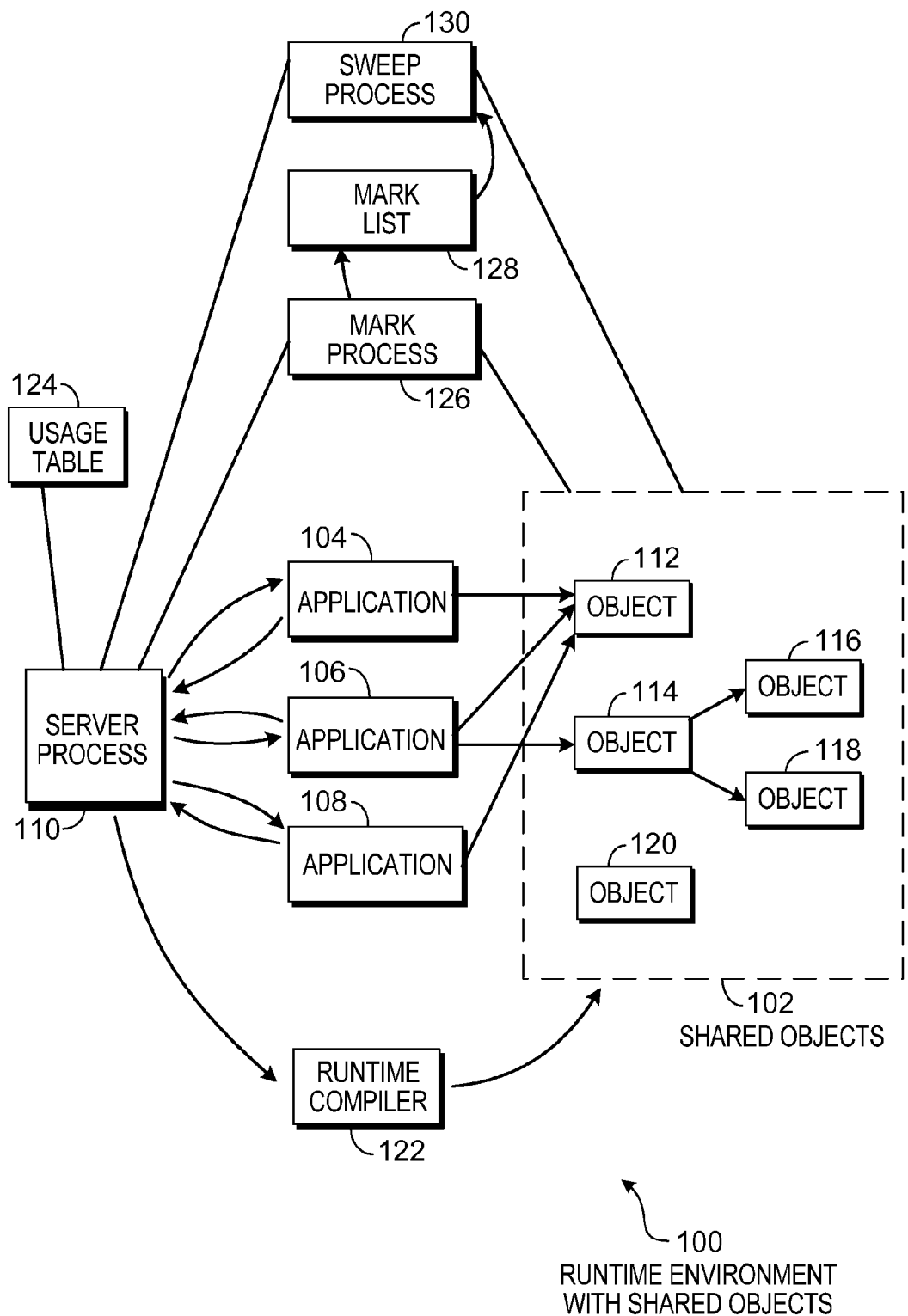
FIG. 1 is a diagram illustration of an embodiment showing a runtime environment with shared objects.

Objects created in a runtime environment may be shared between two or more applications. When an application identifies an object to use, the object may be identified within a database of objects. If the object is present, the application may use the object. If the object is not present, the object may be created and then used by the application, and the object may be made available for other applications. When an object is no longer used by any application, it may be removed from memory.

In a runtime environment, many objects in memory may be created on demand. A runtime environment typically has a just in time or runtime compiler that may compile source code and create object code that may be executed by an application. In many cases, such a runtime compiler may compile intermediate code and may create object code that is tailored for the specific hardware or software present on the operating device.

By sharing objects between applications, the startup time of an application may be faster when those objects are already present, since the objects may not have to be created. Further, sharing objects may result in less memory being used on a device.

In a runtime environment, a just-in-time compiler may create objects during the execution of an application. The dynamic nature of a just-in-time compiler allows an object to be created when the object is requested, and the object may be different than if the object was created when the application started. For example, a just-in-time compiler may link to one set of objects or another set based on the availability of certain resources when an object is created. Because of this nature, some shared objects may be created and destroyed as requested, throughout the course of execution of an application.

For the purposes of this specification and claims, the term "application" may be used to denote different executing components in different environments. The term "application" is used as a synonym and used interchangeably with "process", "client", "program", or similar concepts in different embodiments. In some embodiments, the term "application" may be used to refer to a portion of a program or process. Throughout this specification and claims, any mention of the term "application" may include other embodiments that be used interchangeably with embodiments that use a "process", "client", "program", or other construct to describe an executing component on a computer system.

For the purposes of this specification and claims, the term "object" as stored in memory may be anything stored in memory and used as read only objects. Typically, the memory object may be loaded into random access memory (RAM) but other embodiments may store memory objects using other devices and technologies. The term "object" may refer to any unit of memory that may be shared. In some embodiments, the term "object" may refer to an "assembly", "dynamic linked library" (DLL), "module", "package", "library", or other collection of objects. In some embodiments, the term "object" may refer to individual components or data objects in memory, such as "type", "class", "method", "subroutine", or other executable code or data structures.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a runtime environment with shared objects between applications. Embodiment 100 is a simplified example of the functional components that may be used to create, share, and manage objects in memory.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 100 is an example of a system for sharing objects in memory between applications. A database of shared objects 102 may be accessed by applications 104, 106, and 108. As objects are requested, the objects may be created and made available in the database of shared objects 102. As objects are no longer used, the objects may be removed from the database of shared objects 102.

Embodiment 100 illustrates one architecture for a system that shares objects between applications. Other embodiments may have different components or may be organized in different manners.

In order to share objects between applications, a database of available objects may be searched to determine if a matching object may exist in the database. In some embodiments, such as embodiment 300 illustrated later in this specification, a server process 110 may identify the matching object. Other embodiments, such as embodiment 400 illustrated later in this specification, an application may search for and identify the matching object.

Embodiment 100 illustrates an embodiment that may use a server process 110 to manage the various shared objects. The server process 110 may coordinate communication with and manage the database of shared objects 102, as well as discarding objects that may no longer be used. In other embodiments, a separate server process 110 may not be used, in which case each application 104, 106, and 108 may perform some of the operations of the server process 110.

The applications 104, 106, and 108 may call objects outside of the respective application. In a typical embodiment, an executing application may make a call into a dynamic linked library (DLL), assembly, module, package, library, or other group or collection of memory objects. Typically, the invoking application may reference one or more elements that may be within the collection of memory objects, but the entire collection may be loaded into memory. Many times, the invoking application may make many different calls into the collection to reference several different objects contained within the collection.

In a runtime environment, the shared data objects may be created on request. The shared data objects may be processed data that is created from source code by a compiler, for example. Many runtime environments may use a two stage compiling process in which source code written by a developer may be first compiled into intermediate code, and then a runtime compiler 122 that may compile intermediate code into data objects that may be used by executing applications. When the runtime compiler 122 performs its task, objects such as data types, classes, methods, subroutines, and other objects may be created. These runtime objects may be stored in the database of shared objects 102.

Various objects are illustrated in the database of shared objects 102. Object 112 is illustrated as being used by applications 104, 106, and 108. Object 114 is illustrated as being used by application 106. Objects 116 and 118 are illustrated as being called from within object 114. Object 120 is illustrated as not being related to any application or object.

Object 112 is being shared by multiple applications. When objects are shared between applications, the objects may be exactly the same as the objects that would have been separately created for each application. In order to ensure that the objects are precisely the same as the desired applications, some embodiments may store a set of input parameters that may be used to call each object. If the input parameters of a desired object match the input parameters saved for an existing object, the objects may be shared.

Input parameters may be any variable or changeable item that may be used to create the object. When an application makes a call to a dynamic linked library, for example, the name and version number of the dynamic linked library may be sufficient to precisely identify the object. In some embodiments, additional parameters may be used as input to creating an object, and some embodiments may have certain unique identifiers, such as globally unique identifiers (GUID) that may be used to identify specific configurations of an object.

Different embodiments may have different mechanisms by which an object may be searched. In some cases, a database of objects may include a table that contains metadata about the objects, including the input parameters used to create the objects. Such a table may be searched by an application or server process to identify an existing copy of a requested object.

Object 114 is illustrated as being related to objects 116 and 118. In many cases, an object may call another object. For example, a dynamic linked library may reference two other dynamic linked libraries. Object 120 is illustrated as being referenced by no applications. When an object is no longer referenced by an application, the object may be removed from the database of shared objects 102. As in the case of objects 116 and 118, some objects may not be called directly from an application but may be called by other objects that may, in turn, be called by an application.

Objects 116 and 118 are illustrated as being one level removed from an application. In some embodiments, many levels of objects calling other objects may exist.

The server process 110 may maintain a usage table 124 that may keep track of objects in the database of shared objects 102. In a simple embodiment, the server process 110 may monitor the usage of objects and for each object, the server process 110 may increment a counter for each application that accesses an object, then decrement the counter when the application no longer exists or no longer accesses the object. When the counter has a positive value, the object is in use, and when the counter is zero, the object may be ready for removal.

In some embodiments, the usage table 124 may be scanned to determine if a specific object is present and may be shared. The scanning may be performed by the server process 110 or by one of the applications 104, 106, and 108.

In order to manage the objects within the database of shared objects 102, unused objects may be removed from the database. Many different mechanisms may be used to periodically scan the database of shared objects 102, identify unused objects, and remove the objects from the database.

One such mechanism may be a mark and sweep process. A mark process 126 may periodically scan the objects and mark those objects that may not be referenced by other objects or applications. The mark process 126 may create a mark list 128. A sweep process 130 may then scan the objects in the mark list 128 and remove those objects that continue to be unreferenced. In many cases, a sweep operation may be performed after a period of time or when the various applications have returned to a safe state where the applications may not request external objects. In some embodiments, objects may be marked while in use and not marked when not in use. Other embodiments may perform this operation in other ways.

An example of an embodiment of a method performed by a mark process 126 is illustrated as embodiment 500 illustrated later in this specification. An example of an embodiment of a method performed by a sweep process 130 is illustrated as embodiment 600 illustrated later in this specification.

In embodiment 100, the functions of the mark process 126 and sweep process 130 are illustrated as separate processes from the server process 110. In many embodiments, the functionality of the server process 110 may encompass the mark process 126 and sweep process 130. In some embodiments, the mark process 126 and sweep process 130 may be independently executing processes from the server process 110.

Figure 2:
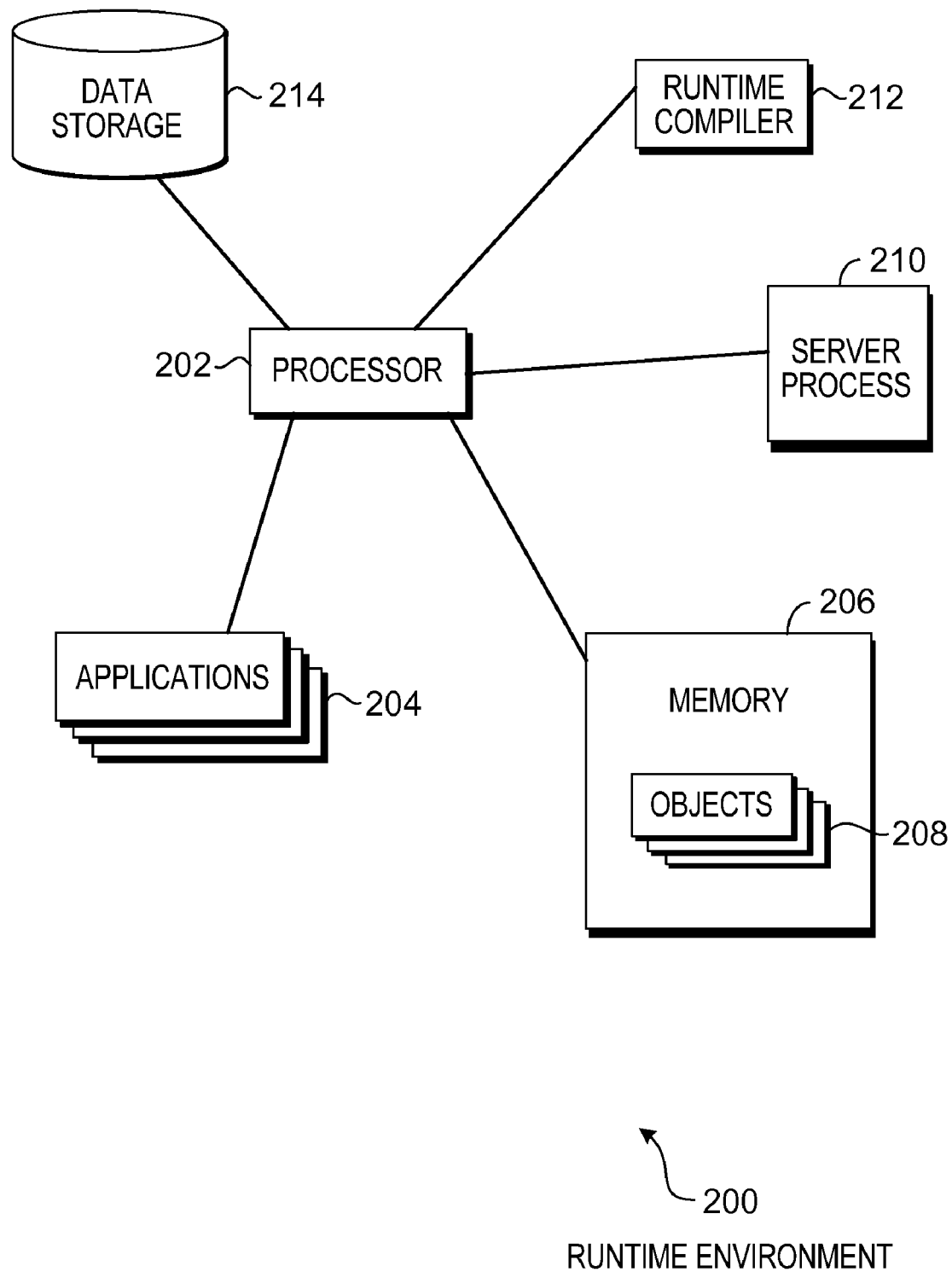
FIG. 2 is a diagram illustration of an embodiment showing a runtime environment.

FIG. 2 is a diagram of an embodiment 200 showing a runtime environment in which memory objects may be shared between applications. Embodiment 200 is a simplified example of the hardware and software components that may make up a device that may implement the functionality of shared memory objects as described in embodiment 100.

The diagram of FIG. 2 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 may be any type of computing device. A typical embodiment may be a personal computer, server computer, or other common computing device. Some embodiments may implemented in a hand held device, such as a laptop computer, personal digital assistant, mobile telephone, hand held scanner, or other device. In some cases, a device may be a network infrastructure device, such as a router, hub, wireless access point, or other device.

Embodiment 200 may have a processor 202 which may execute instructions to perform various applications 204. When the applications 204 are operating, a memory device 206 may contain various objects 208 that may be called by the applications 204. As described in embodiment 100, the memory objects 208 may be shared between certain applications 204 in some cases.

A server process 210 may operate on the processor 202 and help to manage the shared objects 208. The server process 210 may assist in locating a requested object for a particular application, and may remove any unused objects 208.

In many embodiments, a runtime compiler 212 may create the objects 208 as requested by an application 204. A data storage device 214, which may be a hard disk or other storage device, may contain source code that is compiled by the runtime compiler 212 to create one or more objects 208.

Figure 3:
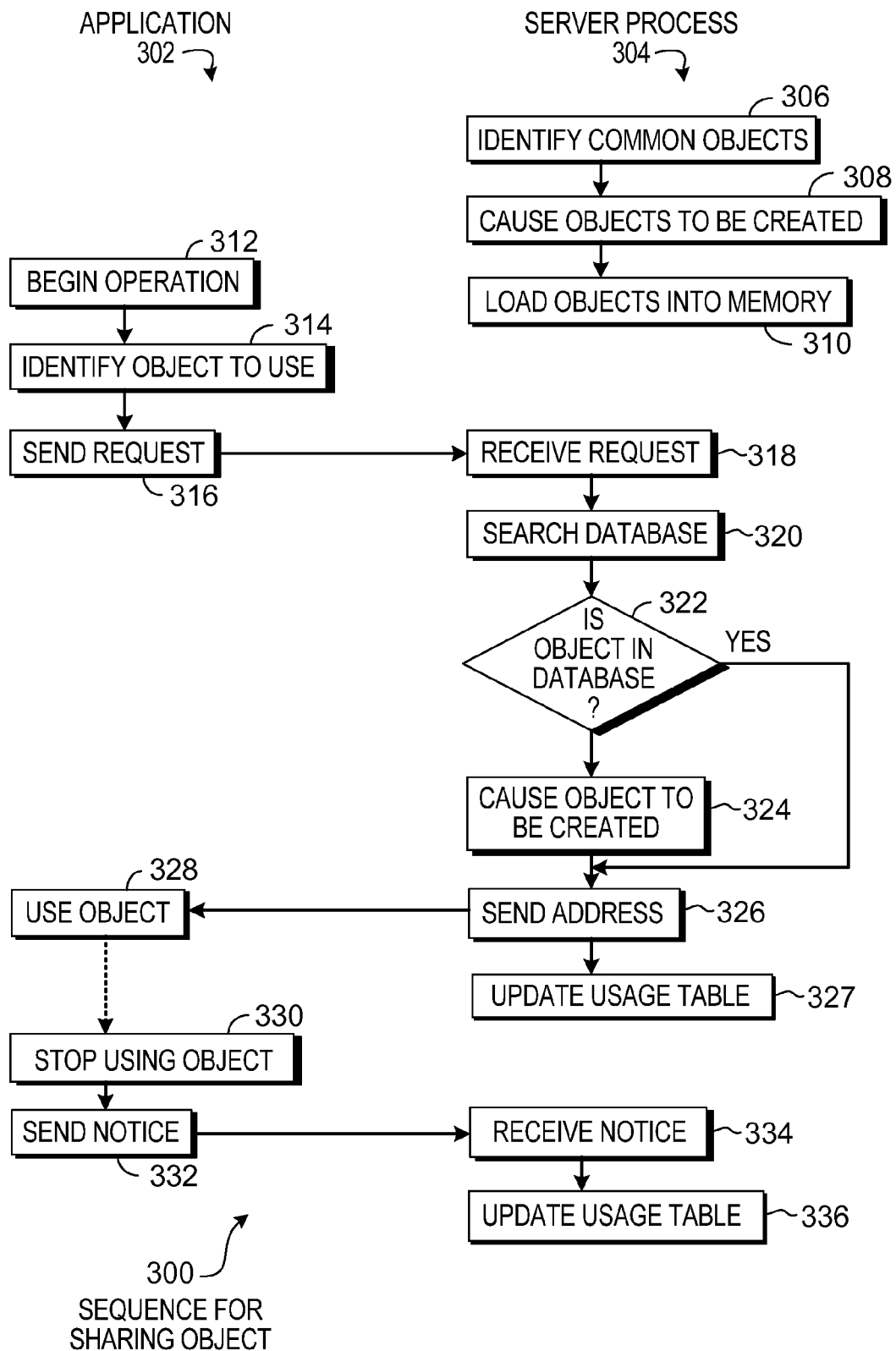
FIG. 3 is a timeline illustration of an embodiment showing a method for sharing an object where an application performs a search.

FIG. 3 is a timeline illustration of an embodiment 300 showing a sequence for sharing an object. Embodiment 300 is a simplified example of merely one method that may be performed by an application 302 and a server process 304. The application 302 may correspond to the actions of one of the applications 104, 106, or 108 and the server process 304 may correspond to the actions of the server process 110 described in embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 is one example of a method or sequence for sharing an object. In embodiment 300, the server process 304 may perform a search for a matching object. Embodiment 400 illustrates a different method for sharing an object where an application may perform the search or a matching object. Some embodiments may use the method of embodiment 300 and others may use the method of embodiment 400.

Embodiment 300 illustrates the actions that may be performed by an application 302 on the left hand column and the actions that may be performed by a server process 304 on the right hand column. Exchanges of information between the application 302 and the server process 304 are illustrated by lines between the two columns.

In some embodiments, a server process 304 may load commonly used objects into memory before an application starts operation. In such a case, the commonly used objects may be kept in memory regardless if any application references the objects. Such an embodiment may have faster start up times for applications that use the common objects.

Common objects may be identified in block 306 and may be created in block 308. The objects that may be identified in block 306 may be objects that are used by virtually all applications or by a group of applications that are expected to be executed. In a typical runtime environment, there may be several objects that may be created and used for each application and may be common to all or many of the applications. Those objects may be loaded into memory in block 310.

The operations of blocks 306 through 310 may be performed prior to launching the application 302. In some cases, the operations of block 306 through 310 may be triggered by the operations of other applications.

Some embodiments may perform the operations of blocks 306 through 310 at startup. Such an embodiment may create certain objects that may be in memory before any applications operate. These objects may be used by many different applications or may be common to applications that are expected to be executed. In some such embodiments, some of the memory objects may be marked so that they are not removed from memory by a mark and sweep operation, for example.

An application 302 may begin operation in block 312. As the application 302 executes, an object may be identified by the application in block 314. The object may be any call or reference outside of the application itself. A common example may be a call to a dynamic linked library (DLL), assembly, or other group of executable code or data structures.

The object that is identified in block 314 may be identified with as much specificity as possible. For example, a call to a DLL may include the name of the DLL and a version number. In some cases, a serial number, GUID, or other unique identifier may be used to precisely and unambiguously identify the object. The application 302 may send a request for the object in block 316.

In block 318, a server process 304 may receive a request for an object.

A database of shared objects may be searched in block 320. Different embodiments may have different mechanisms for searching for a particular object that may be in memory. In some embodiments, a database may keep metadata about the shared objects in a table, linked list, or other searchable form. The server process 304 may search the metadata to determine if the precise object being requested is already present.

If the object is not in the database in block 322, the object may be created in block 324. In many embodiments, the object may be created by launching a runtime compiler to create the object. A runtime compiler may create executable code as well as data structures or other objects that may be used by the application 302.

The address of the object may be sent from the server process 304 in block 326. After sending the address in block 326, the server process 304 may update a usage table in block 327 to indicate that application 302 is accessing the requested object.

If the object is in the database in block 322, the process of creating the object is skipped and the method may jump to block 326.

The address provided in block 326 may be used by the application 302 to use the object in block 328.

When the application 302 stops using the object in block 330, the application 302 may send a notice in block 332 that the object is no longer in use.

The notice may be received in block 334 and the usage table may be updated in block 336.

Figure 4:
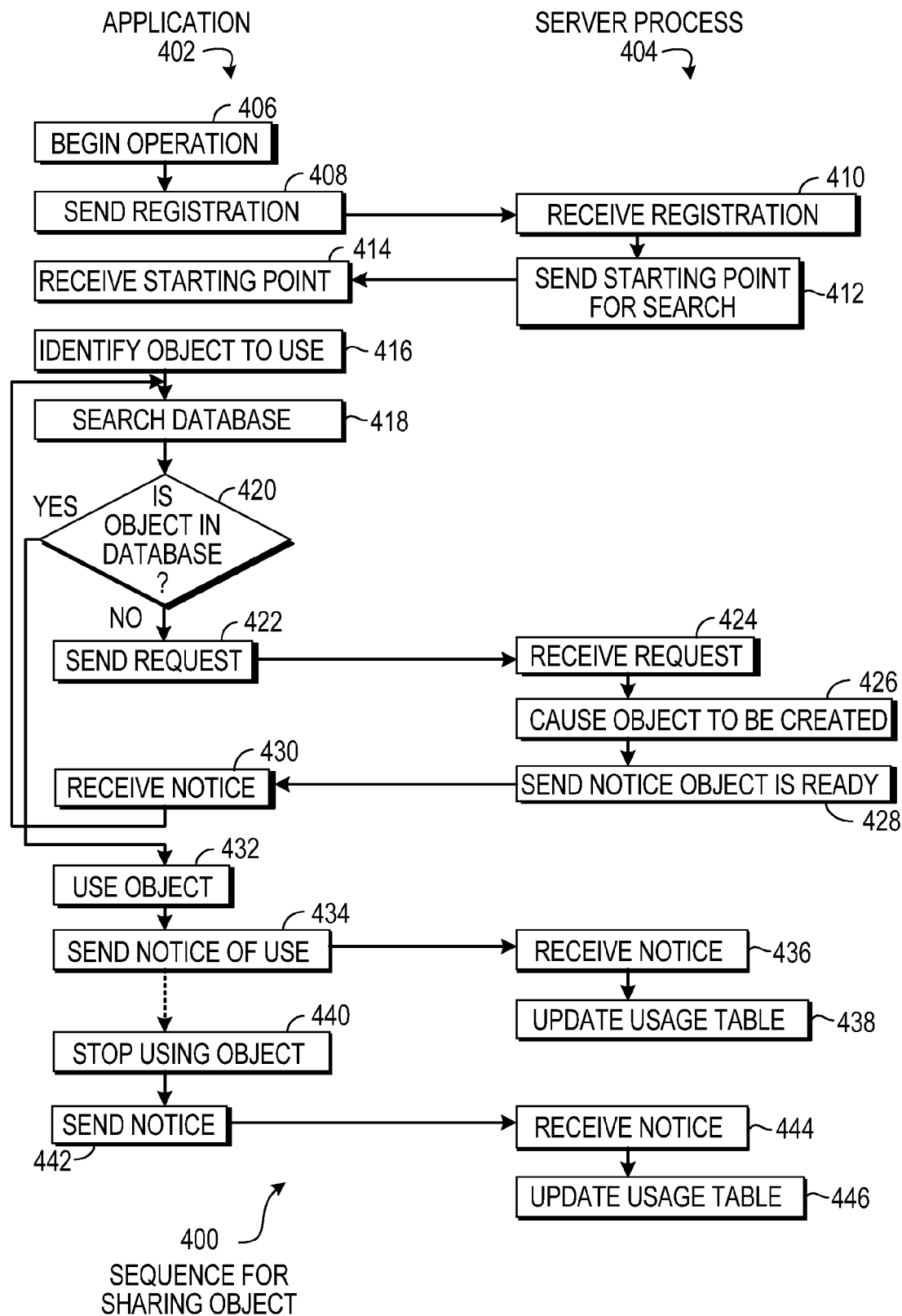
FIG. 4 is a timeline illustration of an embodiment showing a method for sharing an object where a server process performs a search.

FIG. 4 is a timeline illustration of an embodiment 400 showing a sequence for sharing an object. Embodiment 400 is a simplified example of merely one method that may be performed by an application 402 and a server process 404. The application 402 may correspond to the actions of one of the applications 104, 106, or 108 and the server process 404 may correspond to the actions of the server process 110 described in embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 is one example of a method or sequence for sharing an object. In embodiment 400, the application 402 may perform a search for a matching object.

Embodiment 400 illustrates the actions that may be performed by an application 402 on the left hand column and the actions that may be performed by a server process 404 on the right hand column. Exchanges of information between the application 402 and the server process 404 are illustrated by lines between the two columns.

The application 402 may begin operation in block 406, and may send registration information in block 408 to the server process 404. The registration information may be any type of information that may identify the application 402. In some embodiments, detailed information concerning the application 402 may be transmitted.

The registration information may be received by the server process 404 in block 410, and the starting point for a search may be transmitted in block 412. The registration information may be used to track the usage of objects within the database of shared objects. The starting point for the search in block 412 may be an address for a list or table of objects in the database of shared objects. The starting point of block 412 may be used by an application to search for a shared object.

The starting point may be received by the application 402 in block 414.

When the application 402 identifies an object to use in block 416, the database may be searched in block 418. Embodiment 400 illustrates a method by which the application 402 performs the search. In embodiment 300, a similar search was performed by the server process 304.

If the object is not in the database in block 420, the application 402 may send a request in block 422 to the server process 404.

The server process 404 may receive the request in block 424 and may cause the object to be created in block 426. In many cases, the server process 404 may launch a runtime compiler or other process to create the data object in block 426. When the object is created, a notice may be transmitted in block 428 indicating that the object is ready.

The notice may be received by the application 402 in block 430 and the process may return to block 418.

If the object is in the database in block 420, the object may be used in block 432. When the object is searched in the database in block 418, the application 402 may be able to determine an address or other mechanism by which the application 402 may use the object directly, without having to communicate with the server process 404.

When the object is being used by the application 402, a notice of use may be sent in block 434 to the server process 404. The server process 404 may receive the notice in block 436 and update the usage table in block 438.

When the application 402 stops using the object in block 440, the application 402 may send notice in block 442. The server process 404 may receive the notice in block 444 and update the usage table in block 446.

Embodiments 300 and 400 are simplified examples of the methods that may be performed by an application and a server process. In embodiment 300, the server process may take a more central role in searching for objects, while in embodiment 400, the server process may perform a lesser role of merely keeping track of the objects that are being used.

Figure 5:
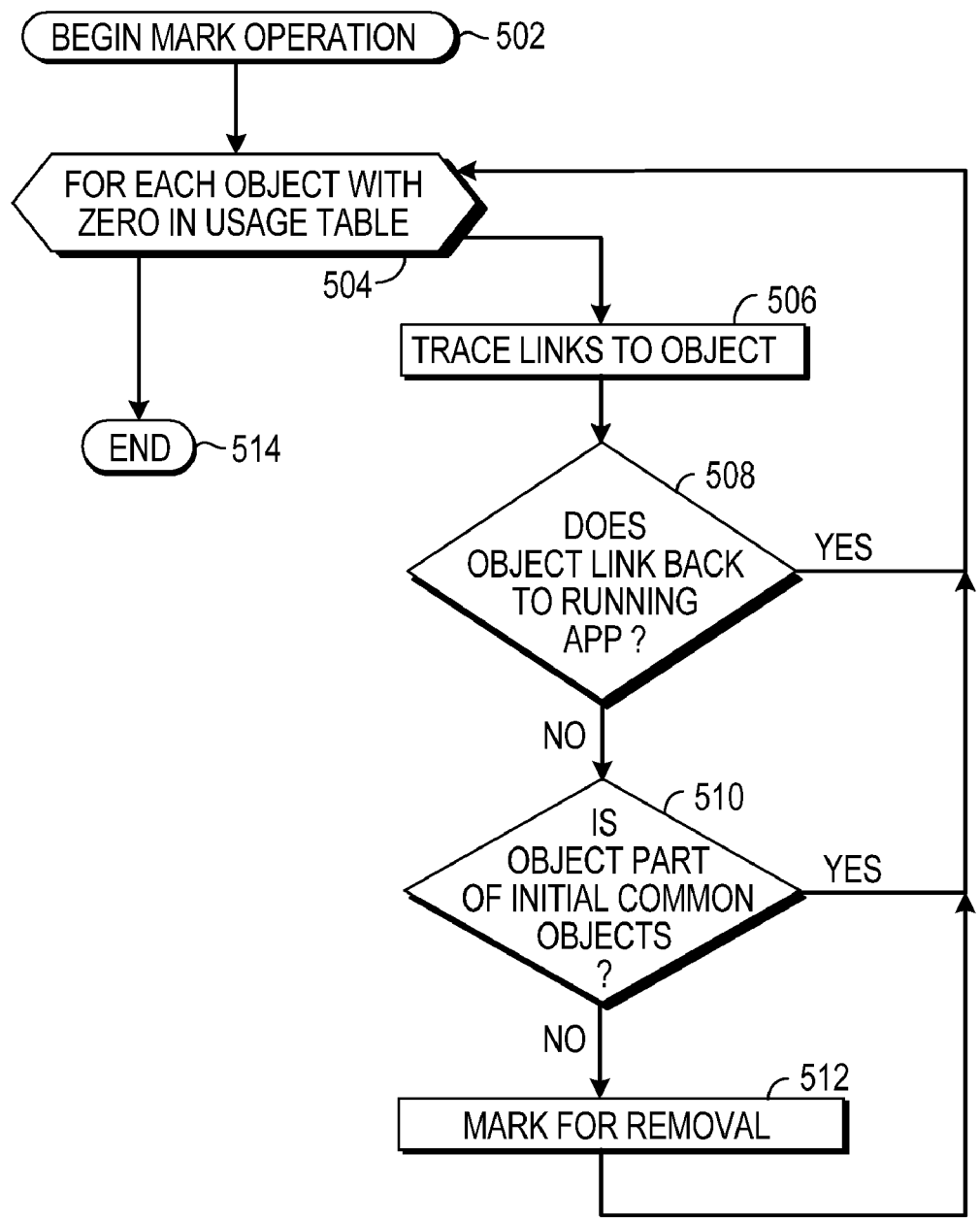
FIG. 5 is a flowchart illustration of an embodiment showing a method for performing a mark operation.

FIG. 5 is a flowchart illustration of an embodiment 500 showing a sequence for a marking operation. Embodiment 500 is a simplified example of merely one method that may be performed by a mark process 126 described in embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

In a typical use scenario, several applications may be using and sharing objects in memory. As applications are started and stopped, some objects may be added to the database of shared objects, while other objects may become unused. In order to effectively manage the memory, the unused objects may be removed from the database of shared objects.

There are many different processes and mechanisms by which an unused shared object may be identified for removal. One example of such a process may use a locked list that may enable one and only one application to add or remove an object at a time. Another process is described in embodiments 500 and 600 that use a two stage approach to identifying those objects that are no longer in use.

The process of embodiments 500 and 600 may be performed in sequence, with a pause or wait time between them. In embodiment 500, each object is examined to see if the object is in use. If so, the object is marked for removal. In embodiment 600, each item in the marked list is checked again and, if the object is still not in use, the object is removed. Other embodiments may mark objects as 'in use' and may remove the object is an object is unmarked.

The two stage process of embodiments 500 and 600 may take into account the case where an application is searching for a specific object during the execution of embodiment 500 and may not locate the object until after embodiment 500 has completed. If the application succeeds in finding the object after embodiment 500 has been completed but before embodiment 600 has started, the object will be unmarked and returned to a normal status of a shared object.

Embodiment 500 may use a simple usage table described earlier in this specification. In such a usage table, a counter may be maintained for each object in the database of shared objects. When an application requests an object and uses the object, the counter associated with the object may be incremented by one. When an application has completed operation and no longer accessed the object, the counter associated with the object may be decremented by one. As applications start and stop access to the object, the counter may be greater than zero. When the counter reaches zero, the object may be assumed to be unused by any application and may be a candidate for removal.

The mark operation may begin in block 502.

For each object with a zero in the usage table in block in block 504, links to the object may be traced in block 506. If there is a link to the object in block 508, the process returns to block 504 to process another object.

Some embodiments may have facilities for tracking or tracing links between one object to another. In some embodiments, the tracing performed in block 506 may be capable of tracing links between objects across multiple links. In other embodiments, the tracing in block 506 may only be able to determine if one link is present into an object.

If no object links to the object in block 508, and, the object is not part of the set of initial common objects in block 510, the object may be marked for removal in block 512. The process may return to block 504 to process another object.

The set of initial common objects in block 510 may refer to common objects that are created in the process of blocks 306, 308, and 310 of embodiment 300. If the object is a member of the set in block 510, the object is ignored and the process may return to block 504 to process another object.

When all of the objects from block 504 are processed, the mark operation may end in block 514.

Figure 6:
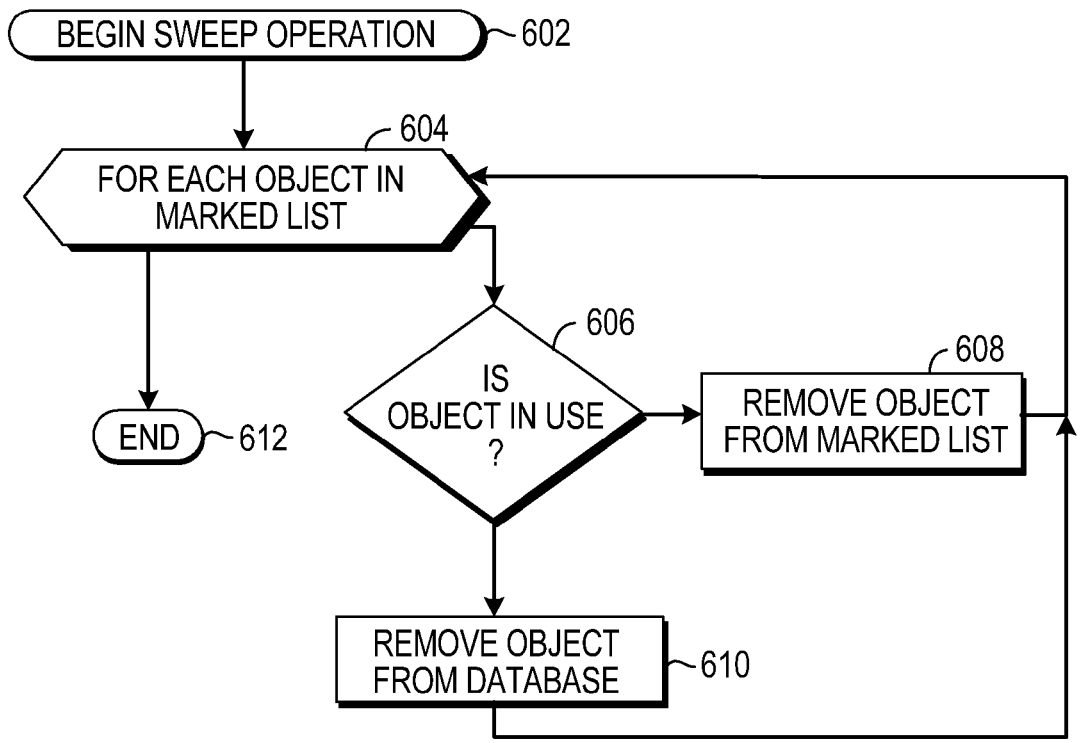
FIG. 6 is a flowchart illustration of an embodiment showing a method for performing a sweep operation.

FIG. 6 is a flowchart illustration of an embodiment 600 showing a sequence for a sweep operation. Embodiment 600 is a simplified example of merely one method that may be performed by a sweep process 130 described in embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 600 may work in conjunction with embodiment 500 and may perform a second check on an object and remove the object. Embodiment 600 may be performed periodically after the mark process of embodiment 500 has been performed. In many cases, embodiment 600 may be an independent process that may be executed when any executing applications are in a mode in which the applications are not requesting objects. Embodiment 600 may use the marked list created in block 512 of embodiment 500.

The sweep operation may begin in block 602.

For each object in the marked list in block 604, if the object is in use in block 606, the object may be removed from the marked list in block 608.

If the object is not in use in block 606, the object may be removed from the database in block 610. In many cases, the object may be deleted from memory and the memory may be returned to a memory pool to be used for other objects.

After processing each object in the marked list in block 604, the sweep operation may end in block 612.

Embodiment 600 performs an additional check in block 606 to determine if an object is in use. The check in block 606 is in addition to the check in block 508 performed in embodiment 500. The second check of block 606 may prevent removal of an object when that object is being used by an application that starts between the execution of embodiment 500 and embodiment 600.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method comprising:
   establishing communications between a first application and a server process;
   identifying a first set of processed data to be used by said first application, said first set of processed data comprising compiled executable code created by a runtime compiler during the execution of the application;
   searching a database of processed data to identify said first set of processed data within said database, said database being accessed through said server process;
   accessing at least a portion of said first processed data by said first application;
   determining that said first set of processed data is not being used by said first application;
   determining that no other process is using said first set of processed data;
   removing said first set of processed data from said database; and
   sending a communication from said first application to said server process indicating that said first set of processed data is not in use.

2. The method of claim 1 further comprising adding said first set of said processed data to said database by a method comprising:
   determining that said first set of processed data is not within said database of processed data;
   causing said first set of processed data to be created; and
   adding said first set of processed data to said database.

3. The method of claim 2, said first set of processed data being created at least in part by launching a just in time compiler.

4. The method of claim 1 further comprising:
   establishing communications between a second application and said server process;
   identifying said first set of processed data to be used by said second application;
   searching said database of processed data to identify said first processed data within said database; and
   accessing said first set of processed data by said second application.

5. The method of claim 1 further comprising:
   sending a communication from said first application to said server process indicating that said first set of processed data is in use.

6. The method of claim 1, said searching a database being performed by said first application.

7. The method of claim 1, said searching a database being performed by said server process.

8. The method of claim 1, said database comprising a list of sets of processed data.

9. A system comprising:
   a computer processor;
   a runtime compiler operable on said computer processor;
   a first application operable on said computer processor;
   a server process operable on said computer processor;
   said application and said server process configured to perform a method comprising:
   establishing communications between said first application and said server process;
   identifying a first set of processed data to be used by said first application, said first set of processed data comprising compiled executable code created by said runtime compiler;
   searching a database of processed data to identify said first set of processed data within said database;
   accessing at least a portion of said first processed data by said first application;
   determining that said first set of processed data is not being used by said first application;
   determining that said first set of processed data is not being used by any other application;
   removing said first set of processed data from said database; and
   notifying said server process that said first application is not using said first set of processed data.

10. The system of claim 9, said searching being performed by said application.

11. The system of claim 9 further comprising:
   an intermediate code for said first application, said first application being executable code compiled by said runtime compiler from said intermediate code.

12. The system of claim 9, at least a portion of said first application not comprising executable code compiled by said runtime compiler.

13. A method comprising:
   establishing communications between a first application and a server process and communicating database metadata from said server process to said first application;
   said first application performing a first method comprising:
   identifying a first set of processed data to be used by said first application, said first set of processed data comprising compiled executable code created by a runtime compiler;
   searching a database of processed data to identify said first set of processed data within said database; and
   accessing from said database at least a portion of said first processed data by said first application;
   said first application performing a second method comprising:
   identifying a second set of processed data to be used by said first application, said first set of processed data comprising compiled executable code created by a runtime compiler;

determining that said second set of processed data is not in said database; and notifying said server process;

said server process performing a third method comprising:
receiving metadata identifying said second set of processed data from said first application;
causing said second set of processed data to be created; and
adding said second set of processed data to said database.

14. The method of claim 13, said first set of processed data comprising a plurality of methods.

15. The method of claim 13, further comprising:
said first application performing a fourth method comprising:
determining that said first set of processed data is not being used by said first application; and
sending a notification to said server process;
said server process performing a fifth method comprising:
receiving said notification from said first application;
metadata identifying said second set of processed data from said first application;
causing said second set of processed data to be created; and
adding said second set of processed data to said database.

16. The method of claim 15, said causing said second set of processed data comprising launching a runtime compiler.

* * * * *